(12) United States Patent
Brüggendick et al.

(10) Patent No.: US 8,637,417 B2
(45) Date of Patent: Jan. 28, 2014

(54) METHOD FOR TREATING FLUE GAS CATALYSTS

(75) Inventors: Hermann Brüggendick, Schermbeck (DE); Maik Blohm, Oldenburg (DE)

(73) Assignee: Steag Energy Services GmbH, Essen (DE)

( * ) Notice: Subject to any disclaimer, the term of this patent is extended or adjusted under 35 U.S.C. 154(b) by 347 days.

(21) Appl. No.: 12/384,122

(22) Filed: Apr. 1, 2009

(65) Prior Publication Data

US 2009/0209417 A1     Aug. 20, 2009

Related U.S. Application Data

(62) Division of application No. 11/640,475, filed on Dec. 15, 2006.

(30) Foreign Application Priority Data

Dec. 16, 2005   (EP) ..................................... 05027634

(51) Int. Cl.
*B01J 38/48*    (2006.01)
*B01J 37/00*    (2006.01)

(52) U.S. Cl.
USPC ................. 502/22; 502/60; 502/85; 502/300; 502/305; 502/324; 502/338; 502/345; 502/353

(58) Field of Classification Search
USPC ........... 502/22, 24–33, 76, 85, 305, 321, 353, 502/60, 300, 338, 345
See application file for complete search history.

(56) References Cited

U.S. PATENT DOCUMENTS

| | | | | |
|---|---|---|---|---|
| 3,674,707 A | | 7/1972 | Pieters et al. | 502/26 |
| 4,377,491 A | * | 3/1983 | Canavesi et al. | 502/225 |
| 4,407,733 A | | 10/1983 | Birkenstock et al. | 502/174 |
| 4,615,991 A | | 10/1986 | Obayashi et al. | 502/28 |
| 4,656,147 A | | 4/1987 | Iida et al. | 502/26 |

(Continued)

FOREIGN PATENT DOCUMENTS

| | | |
|---|---|---|
| CA | 2336562 | 1/2000 |
| DE | 38 10 137 A1 | 10/1989 |

(Continued)

OTHER PUBLICATIONS

Emissions Control, *SCR Maintenance Fundamentals*, Ken Wicker and Jim Staudt, Power, Jun. 2004, pp. 52-57.

(Continued)

*Primary Examiner* — Brian Walck
(74) *Attorney, Agent, or Firm* — K&L Gates LLP

(57) ABSTRACT

A method for treating a catalyst base that comprises a contact area of porous material. A fluid, such as a flue gas stream, can be conducted along the contact area. A catalytically relevant substance is introduced into pores of the catalyst base using a transport fluid and remains on pore wall areas after removal of the transport fluid. The introduction is carried out such that an amount of the catalytically relevant substance relative to the surface remains on the pore wall areas as a function of location within the pore and decreases within the pore after exceeding a specific pore depth. A blocking fluid can first be introduced into pore regions beyond the specific pore depth, thus blocking these regions when transport fluid containing the catalytically relevant substance is introduced.

10 Claims, 6 Drawing Sheets

(56) References Cited

U.S. PATENT DOCUMENTS

| | | | |
|---|---|---|---|
| 4,764,498 A | 8/1988 | Wissner et al. | 502/251 |
| 4,977,127 A * | 12/1990 | Rikimaru et al. | 502/309 |
| 5,120,690 A | 6/1992 | Jung et al. | 501/155 |
| 5,151,256 A | 9/1992 | Kato et al. | 423/210 |
| 5,283,052 A | 2/1994 | Hums | 422/223 |
| 5,394,610 A | 3/1995 | Stoephasius et al. | 29/890 |
| 5,453,411 A * | 9/1995 | Dai et al. | 502/315 |
| 5,522,941 A | 6/1996 | Uchinami et al. | 134/37 |
| 5,571,771 A * | 11/1996 | Abel et al. | 502/330 |
| 5,785,937 A | 7/1998 | Neufert et al. | 423/213.2 |
| 5,820,693 A | 10/1998 | Patchett et al. | 134/22.12 |
| 5,869,419 A | 2/1999 | Obayashi et al. | 502/305 |
| 5,873,329 A | 2/1999 | Heering et al. | 122/7 R |
| 5,882,422 A | 3/1999 | Obayashi et al. | 134/1 |
| 5,953,911 A | 9/1999 | Guth et al. | 60/295 |
| 6,025,292 A | 2/2000 | Obayashi et al. | 502/27 |
| 6,080,696 A | 6/2000 | Duke et al. | 502/27 |
| 6,136,222 A | 10/2000 | Friesen et al. | 252/184 |
| 6,232,254 B1 | 5/2001 | Schneider et al. | 502/22 |
| 6,241,286 B1 | 6/2001 | Ogura et al. | 281/29 |
| 6,241,826 B1 | 6/2001 | Dittmer et al. | 134/1 |
| 6,299,695 B1 | 10/2001 | Gilgen | 134/1 |
| 6,387,836 B1 | 5/2002 | Dörr et al. | 502/22 |
| 6,395,665 B2 * | 5/2002 | Nojima et al. | 502/25 |
| 6,455,456 B1 | 9/2002 | Spokoyny | 502/20 |
| 6,482,762 B1 | 11/2002 | Ruffin et al. | 502/33 |
| 6,484,733 B2 | 11/2002 | Budin et al. | 134/22.19 |
| 6,576,585 B2 | 6/2003 | Fischer et al. | 502/309 |
| 6,596,661 B2 | 7/2003 | Neufert | 502/28 |
| 6,631,727 B2 | 10/2003 | Schneider et al. | 134/110 |
| 6,641,785 B1 | 11/2003 | Neufert et al. | 422/177 |
| 6,913,026 B2 | 7/2005 | Winnestaffer et al. | 134/22.18 |
| 6,929,701 B1 | 8/2005 | Patel et al. | 134/1 |
| 7,384,882 B2 | 6/2008 | Sun et al. | 502/27 |
| 7,569,506 B2 | 8/2009 | Foerster | 502/27 |
| 2001/0006929 A1 | 7/2001 | Budin et al. | 502/27 |
| 2002/0006860 A1 | 1/2002 | Schneider et al. | 502/22 |
| 2004/0137209 A1 | 7/2004 | Zeller et al. | 428/304.4 |
| 2004/0163676 A1 | 8/2004 | Winnestaffer et al. | 134/17 |
| 2005/0119109 A1 | 6/2005 | Schneider et al. | 502/22 |
| 2006/0060219 A1 | 3/2006 | Rabitsch et al. | 134/22.11 |
| 2006/0094587 A1 | 5/2006 | Lee et al. | 502/27 |
| 2006/0135347 A1 | 6/2006 | Schluttig et al. | 502/25 |
| 2006/0148639 A1 | 7/2006 | Foerster | 502/27 |
| 2007/0032373 A1 | 2/2007 | Matsumoto et al. | 502/20 |
| 2007/0161509 A1 | 7/2007 | Blohm et al. | 705/37 |
| 2008/0115800 A1 | 5/2008 | Blohm | 134/1 |
| 2009/0162708 A1 | 6/2009 | Zhu et al. | 429/17 |

FOREIGN PATENT DOCUMENTS

| | | |
|---|---|---|
| DE | 38 16 600 A1 | 11/1989 |
| DE | 40 13 720 | 10/1991 |
| DE | 42 17 738 | 12/1993 |
| DE | 43 00 933 C1 | 5/1994 |
| DE | 195 33 912 A1 | 3/1997 |
| DE | 196 28 212 A1 | 1/1998 |
| DE | 197 23 796 | 12/1998 |
| DE | 198 04 522 | 2/1999 |
| DE | 198 29 916 A1 | 1/2000 |
| DE | 102 18 380 A1 | 11/2003 |
| DE | 102 22 915 A1 | 1/2004 |
| DE | 102 41 004 A1 | 3/2004 |
| DE | 102 42 081 A1 | 3/2004 |
| DE | 103 25 779 A1 | 1/2005 |
| EP | 0 335 240 A2 | 3/1989 |
| EP | 0 353 467 A1 | 2/1990 |
| EP | 0 571 664 | 12/1993 |
| EP | 0 677 320 | 10/1995 |
| EP | 0 763 589 B1 | 3/1997 |
| EP | 0 824 973 A2 | 2/1998 |
| EP | 0 910 472 B1 | 4/1999 |
| EP | 19990936166 | 7/1999 |
| EP | 1 098 703 | 5/2001 |
| EP | 1 107 824 | 6/2001 |
| EP | 1 797 954 | 6/2007 |
| EP | 1 833 606 | 9/2007 |
| GB | 1 283 737 | 8/1972 |
| GB | 1483439 * | 8/1977 ............... B01J 27/10 |
| JP | 56037048 | 4/1981 |
| JP | 58 30345 | 2/1983 |
| JP | 2007-297248 | 11/2007 |
| WO | WO 95/20434 | 8/1995 |
| WO | WO 96/16737 | 6/1996 |
| WO | WO 98/02248 | 1/1998 |
| WO | WO 98/55230 | 12/1998 |
| WO | WO 99/12642 | 3/1999 |
| WO | WO 00/01483 | 1/2000 |
| WO | WO 00/12211 | 3/2000 |
| WO | WO 03/099437 A1 | 12/2003 |
| WO | WO 2004/022226 A1 | 3/2004 |
| WO | WO 2004/026447 A1 | 4/2004 |
| WO | WO 2004/073835 A1 | 9/2004 |
| WO | WO 2004/076067 A1 | 9/2004 |
| WO | WO 2006/072569 | 7/2006 |

OTHER PUBLICATIONS

*The Role of Oxalate in Accelerating the Reductive Dissolution of Hematite ($\alpha$-$FE_2O_3$) by Ascorbate*, Steven Banwart, Simon Davies, and Werner Stumm, Colloids and Surfaces, vol. 39, pp. 303-309 (1989).

*Regeneration of Commercial $TiO_2$-$V_2O_5$-$WO_3$ SCR Catalysts Used in Bio Fuel Plants*, Raziyeh Khodayari and C.U. Ingemar Odenbrand, Appliwed Catalysis B. Environmental, vol. 30, pp. 87-99 (2001).

*Differenzierung der Eisenoixde des Bodens durch Extraktion mit Ammoniumoxalat-Losung*, Dr. Von U. Schwertmann May 3, 1964, pp. 194-202.

Wypych, George Knovel Solvents—A Properties Database. Acetic Acid. ChemTec Publishing. Copyright 2008. Online version available at http://knvel.com/web/portal/browse/display?_EXT_KNOVEL_DISPLAY_bookid=635&verticalID=0.

Wypych, George Knovel Solvents—A Properties Database. Formic Acid. ChemTec Publishing. Copyright 2008. Online version available at http://knvel.com/web/portal/browse/display?_EXT_KNOVEL_DISPLAY_bookid=635&verticalID=0.

U.S. Appl. No. 11/640,475, filed Dec. 15, 2006, Brüggendick, et al.
U.S. Appl. No. 12/287,347, filed Oct. 8, 2008, Hartenstein, et al.
U.S. Appl. No. 12/287,365, filed Oct. 8, 2008, Hartenstein, et al.
U.S. Appl. No. 12/384,159, filed Apr. 1, 2009, Bruggendick, et al.

* cited by examiner

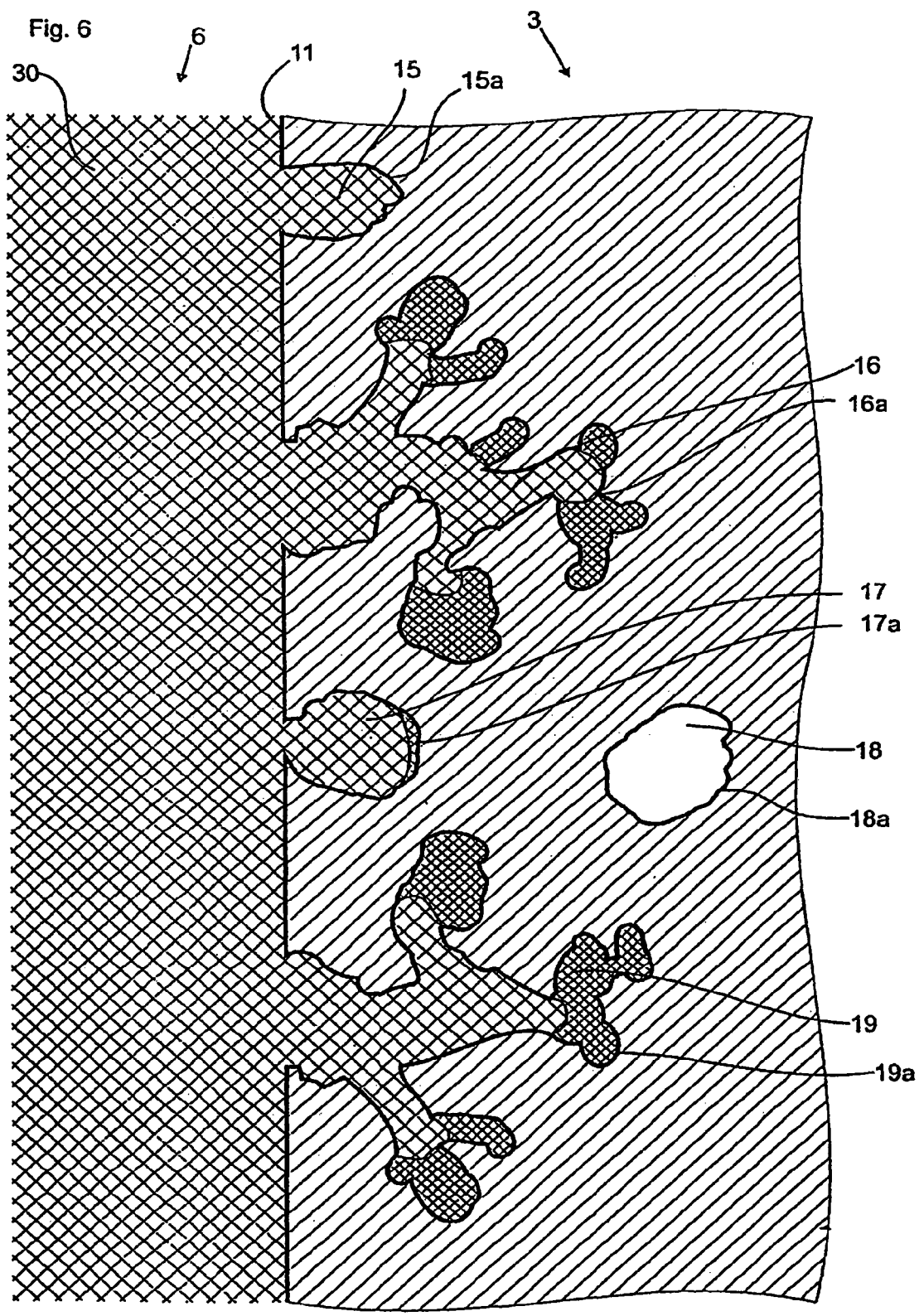

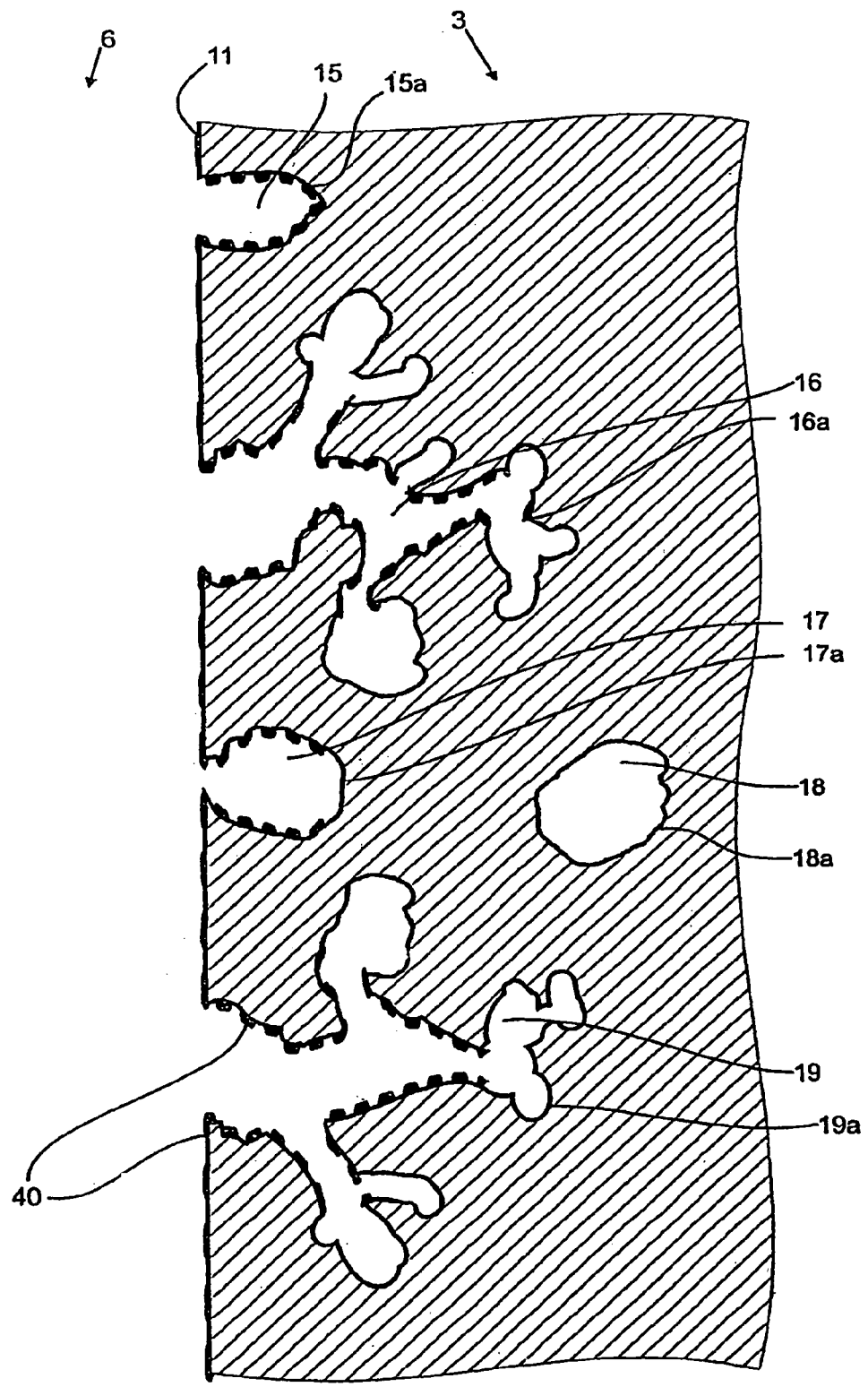

METHOD FOR TREATING FLUE GAS CATALYSTS

CROSS-REFERENCE TO RELATED APPLICATIONS

This application is a divisional of U.S. patent application Ser. No. 11/640,475, filed Dec. 15, 2006, claiming the benefit of European Patent Application 05 027 634.4, filed Dec. 16, 2005, herein incorporated by reference.

FIELD OF THE INVENTION

The invention relates to a method for treating a flue gas catalyst base (substrate/carrier), including reactivating a catalyst base.

BACKGROUND OF THE INVENTION

In order to catalytically accelerate chemical reactions in fluid streams, one uses catalysts that are applied on or contained in catalyst bases. Usually, such bases comprise at least one contact area of a porous material. The surface that is made of and enlarged by the porous material includes active centers favoring a reaction of the reactants carried by the fluid stream. The contact area is understood as a macroscopic boundary of the base material adjacent to the fluid stream. That contact area is to be distinguished from the pore wall areas that have smaller, sometimes microscopic dimensions and are formed by areas defining the boundaries of the pore spaces/volumes. The pore wall areas of such pores leading into an opening in the contact area form one surface with the contact area and enlarge the surface that is accessible by the fluid stream.

The streaming fluid and the reactants (within the fluid) enter (diffuse) into the pore system that is formed by the pores; they come into contact with the active centers located at the pore wall areas and there they are adsorbed. In this process, the reactants react and the reaction products are released by desorption and diffuse out of the pore system back into the fluid stream. Such catalyst bases are in particular used in processes, if exhaust gases are to be cleaned from undesired substances carried within the gases, e.g. when cleaning the flue gas of combustion power plants.

Burning fossil fuels (or waste and/or biomass) produces air pollutants. It is desirable to remove the air pollutants because of their negative effect on the environment. Apart from the dusts that can be removed from flue gas streams by dust removing devices, sulfur compounds are removed by desulfurization plants. However, fossil fuels contain in particular nitrogen compounds that are transformed to nitrogen oxides in the flue gas. Furthermore, a portion of the nitrogen of the combustion air is changed to nitrogen oxide under combustion conditions. Accordingly, in respect of the production of nitrogen oxides, a distinction is made between thermal formation, prompt (direct) nitrogen oxide formation and nitrogen oxide formation from fuel nitrogen. For environmental reasons, the portion of nitrogen oxides ($NO_x$) in exhaust gases should be reduced.

Apart from reducing the formation of nitrogen oxide by primary measures, i.e. measures affecting the fueling, it is becoming more and more common for power plants to also use secondary measures, i.e. removing $NO_x$ compounds from the flue gases.

Apart from other methods (e.g. selective non-catalytic reduction), catalytic reduction methods are in particular relevant due to their large-scale applicability.

The so-called selective catalytic reduction methods (SCR) are used for the $NO_x$ reduction on a large industrial scale. When those methods are used, $NO_x$ is transformed to water and nitrogen using $NH_3$ (ammonia). In the presence of catalysts, the reaction runs faster and/or at a lower temperature and therefore it is also suitable for high flue gas stream velocities. The used catalysts usually consist of catalyst bases (substrates/carriers) of ceramic base materials, in which active metal compounds have been homogeneously introduced or on whose surfaces active metal compounds that combine with the base material have been applied (usually a simple coating cannot be used because of the mechanical stress in the flue gas stream). Frequently, the main component for the catalyst base is titanium dioxide; active centers are formed by adding vanadium, tungsten, molybdenum, copper and/or iron compounds. Zeolites can also be used as catalyst bases.

It is problematic when catalysts are used to reduce nitrogen oxides, as there are competing reactions, which are also favored by the active centers and which can in particular result in the undesired oxidization of sulfur dioxide to sulfur trioxide.

Furthermore, the activity of the catalyst (the desired nitrogen oxide reduction) as well as (due to a decrease in competition) the proportion between the desired catalytic effect and the undesired catalytic effect decreases the longer the catalyst is used. This is the reason that catalyst bases must be reactivated after a certain period of time, i.e. the catalyst base is cleaned, reaction products are removed and the base material is covered/doped with new active centers. For this purpose, a catalytically relevant substance is introduced into pores of the catalyst base using a transport fluid. The introduction is carried out through openings in the contact area, into which the pores lead (pores that do not have any fluid contact to openings in the contact area are irrelevant, since flue gas cannot enter such pores during operation). After removal of the transport fluid, the catalytically relevant substance remains on the pore wall areas of the pores and there it forms active centers.

Usually, catalysts that have been reactivated in such a way have a similar activity to newly manufactured catalysts. However, it can happen that the proportion between activity (catalysis of the nitrogen oxide reduction) and undesired reactions changes for the worse.

This is the starting point of the invention.

The purpose of the invention is to provide a method for treating a catalyst base, wherein the method can be used for the first manufacturing of catalysts as well as for their reactivation, and wherein the method makes a high activity of the catalyst possible without increasing the undesired side reactions.

SUMMARY OF THE INVENTION

According to the invention, this problem is solved by a method wherein the catalyst base, which comprises at least one contact area of a porous material, is treated by introducing at least one catalytically relevant substance into pores of the catalyst base (which lead into the contact area) by use of a transport fluid, wherein the catalytically relevant substance remains on pore wall areas after removal of the transport fluid. A catalytically relevant substance is a substance that is catalytically active or that can form a catalytically active substance, e.g. by temperature treatment (calcining). The transport fluid may be a fluid or gas or any mixture, e.g. an aerosol or foam. The catalytically relevant substance may be dissolved in the fluid or distributed as superfine particles, e.g. a component of aerosol droplets. According to the invention, the catalytically relevant substance is introduced into the pores in a way that—at least in a plurality of the pores—the catalytically relevant substance's surface amount (i.e. the amount relative to the surface) that remains on the pore wall areas depends on the place within each pore in such a way that the surface amount of the catalytically relevant substance decreases within the pore beyond a certain pore depth, i.e. if a certain pore depth is exceeded.

The invention is based on the knowledge that most of the desired catalytic reactions take place in the pores' regions close to the contact area and that there—due to competition—the undesired reactions are suppressed, whereas the undesired reactions prevail in the deeper pore regions; therefore the catalytically active centers should be reduced there.

Accordingly, the catalytically relevant substance is unequally introduced into the pore system of the catalyst base. The catalytically relevant substance does not cover the whole pore system uniformly (as suggested by the state of the art). The introduced substance amount that covers the pore wall areas (pore surfaces), i.e. the transport fluid amount that fills the pore spaces, depends on the location/position of the place of the respective pore wall areas or pore spaces within the pore. A different amount of the catalytically relevant substance remains, depending on the pore depth of the respective pore wall area, i.e. depending on the distance the flue gas components must travel from the pore's opening to the place of the pore wall area. Pore depth is understood as the distance from the opening through the pore to a place in the pore. The maximum distance is the complete extension of the pore into the material, i.e. the total pore depth. According to the invention, the surface amount of the catalytically relevant substance decreases after exceeding a specific pore depth. The "specific pore depth" could be the same for all pores leading into the contact area irrespective of the diameter and the form of the pore. However, it is preferred that the specific pore depth, beyond which the amount of the catalytically relevant substance decreases (in proportion to the covered area), depends on the form of the pore, e.g. that it is greater for a pore having a greater diameter than for a narrow pore. It is preferred that the specific pore depth corresponds to an entering depth that is reached by a given fluid in a predetermined time. The decrease of the coverage beyond the specific pore depth may be a sudden or continuous decrease. The statement that the wall coverage decreases after reaching a specific pore depth does not exclude that there may be a minor decrease in wall coverage even before reaching the specific pore depth; before reaching the specific pore depth, the wall coverage may increase, remain constant, decrease to a minor degree and/or vary. This is supposed to mean that there is a qualitative jump (step) in the degree and/or kind of decrease after reaching the specific pore depth; the decrease increases either suddenly or continuously. When the pore walls are covered by the catalytically relevant substance in such a way it is ensured that the competing reactions that occur in the deeper pore regions are less supported. By contrast, according to the treatment methods known from the state of the art, the surface coverage often increases with increasing pore depth, since the pore system is flooded with a transport fluid and subsequently the catalyst base is dried. Usually, the substance carried in the transport fluid concentrates in the rear pore spaces (which is not desired.)

According to the invention, a great amount of the transport fluid with the substance enters regions having a low pore depth (pore regions close to the contact area). Less substance is introduced into pore regions that can only be reached by the flue gas stream if it covers a greater distance (greater pore depth).

The method of the invention provides an activated catalyst base, which has a lot of active centers in the pore regions that can easily be reached by the flue gas stream together with further substances (e.g. ammonia) and which has less active centers in the regions, where undesired side reactions are more likely to occur. In this respect, the outer design of the catalyst base is of no importance. For instance, the method can be equally used for honeycomb or plate catalysts.

Any fluid that can carry a catalytically relevant substance (e.g. by dissolving the substance) may be used as transport fluid. In particular gases, liquids or aerosols may be used as transport fluids. A catalytically relevant substance is understood to be any substance that has a catalytic effect or that can be transformed to a catalytically effective compound during or after application to the base material (e.g. by subsequent physical and/or chemical treatment).

Catalysts that have been activated according to the method of the invention produce less undesired side reaction products, like e.g. sulfur trioxide, at a similar performance level (activity). Accordingly, the impairment of subsequent components of the installation caused by side reaction products (sulfur trioxide leads e.g. to corrosion) is reduced, and their life time and the operational safety of the whole installation are increased. Costs for additional maintenance, repairs and loss of production are avoided and the risk of malfunctioning is reduced. Visible exhaust gas plumes are reduced. An otherwise necessary sulfur trioxide elimination may not be necessary anymore.

According to the preferred embodiment of the method of the invention, the introduction is carried out in a way that at least in a plurality of the pores, the catalytically relevant substance's surface amount remaining on the pore wall areas within each pore depends on the pore depth in a way that the surface amount increases, remains essentially constant or at most decreases only to a minor degree up to the specific pore depth and suddenly starts decreasing after exceeding the specific pore depth or that the increase of the surface amount suddenly starts decreasing after exceeding the specific pore depth.

In proximity to the pore's opening to the contact area, i.e. in the region of a low pore depth, the pore wall coverage does not decrease substantially, wherein the coverage in this region may decrease or increase in dependence on the used method. Beyond a pore depth $t_i$, the surface coverage (i.e. the amount of coverage relative to the surface) substantially decreases in the direction of an increasing pore depth so that regions of a pore depth $>t_i$ are covered to a lesser degree. The transition may be sudden over a short distance in the sense that the coverage decreases over a short distance to a substantially lower coverage. But it is also possible that the coverage decreases uniformly (e.g. linearly, quadratically or exponentially) beyond a pore depth $>t_i$. The expression that is used herein that the amount or its increase should "suddenly start decreasing" should be understood as a change of the functional dependence of the area coverage on the pore depth, wherein a very steep decrease takes place in the function or one of its derivatives and wherein the function—not taking into account any superimposed fluctuations—continuously decreases.

The catalytically relevant substance may be introduced into the pores of the contact area of the catalyst base in different ways to ensure that the substance is introduced in dependence on the pore depth. According to the invention, some introduction methods make use of the natural thermodynamic processes. (During the treatment) the transport fluid with the catalytically relevant substance usually needs more time to enter the pore regions that are also more slowly entered by flue gas components during operation (great pore depth). In any case this is true for all substances that are introduced (diffused) into the pores, using the thermodynamic behavior.

On the other hand, more time or energy is necessary to remove substances from pore regions in greater pore depths. Accordingly, the substances are removed from the pore system in dependence on the pore depth during the process of removing substances from the catalyst base (e.g. by vaporization or washing out), namely the substances are more thoroughly removed from the regions of a lower pore depth than from the regions of a greater pore depth.

However, in respect of a catalytically relevant substance or transport fluid in which a catalytically relevant substance is dissolved, this causes a situation or coverage of the pore system that is contrary to the desired situation (more substance in regions close to the contact area).

According to an embodiment of the invention's method, it is therefore preferred that firstly a blocking fluid is introduced into the pores in such a way that the pores in regions remote from the contact area beyond the specific pore depth are filled with the blocking fluid.

Subsequently, the transport fluid is introduced into the pores of the material, wherein the transport fluid contains the catalytically relevant substance. At least part of the blocking fluid and the transport fluid is removed from the pores so that at least a part of the catalytically relevant substance remains on the pore wall areas.

The accessible pores are partially filled after introducing the blocking fluid so that deeper pore regions are blocked by the blocking fluid when the transport fluid is introduced. Accordingly, when the transport fluid is subsequently introduced, in particular the pore regions (close to the surface) that have a smaller distance to the contact area of the catalyst base are filled. The catalytically relevant substance is dissolved in the transport fluid (or it is transported in any other way by the fluid).

Ideally, all accessible pores are completely filled with the blocking and transport fluids after introducing the first and second fluids. Since the catalytically relevant substance is transported in the transport fluid. only the pore wall areas (close to the surface) that are adjacent to the transport fluid come into contact with the catalytically relevant substance. Although the catalytically relevant substance may diffuse into the blocking fluid at the phase boundary between the blocking fluid and the transport fluid, such a diffusion (in view of the usual residence time of the fluids in the pores) does not change the fact that the amount of the introduced catalytically relevant substance is by far greater in regions of a low pore depth than in regions of a greater pore depth.

After removal of the blocking fluid and the transport fluid from the pores, catalytically relevant substance remains in the pores.

According to the above-described method, the blocking fluid is preferably introduced into a plurality of the pores in such a way that the plurality of the pores are filled at least partially with the first fluid in a first filling step and subsequently the introduced blocking fluid is partially removed from the pores in a removing step.

In practice, introducing the blocking fluid in a filling step and a subsequent removing step is in particular convenient, since such a method makes use of the natural characteristics of the pore system and the thermodynamic processes in the catalyst base. In particular, a fluid can be introduced into a pore system by common methods in a way that it is filled in the best possible way. On the other hand, removing the fluid from the regions of a low pore depth is simpler than from the regions that are located closer to the inside.

In the filling step, the accessible pore system is first nearly completely filled and then, in the removing step, the blocking fluid is removed from the regions of the pores that are located in a low pore depth. This ensures that most of the fluid remains in the regions located deeper in the inside so that the required distribution of the blocking fluid is certain to block those regions to the transport fluid.

According to the method described above it is in particular advantageous, if the catalyst base is soaked in the blocking fluid during the filling step.

Soaking the catalyst base in the blocking fluid ensures an equal distribution of the fluid in the pore system, in particular, if known supporting means (e.g. ultrasonic sound, heating) are used. Such soaking is used e.g. in known and indiscriminate methods for reactivating cleaned catalyst bases; there is sufficient corresponding experience. However, those known methods have the indicated disadvantages of an equal (indiscriminate) distribution of the catalytically relevant substance. According to the invention's method, only the blocking fluid is equally distributed. The desired unequal distribution of the blocking fluid and, indirectly, the distribution of the catalytically relevant substance are not achieved by the filling step, but the removing step (partial removal of the blocking fluid). It is preferred to partially remove the blocking fluid from the pore system of the catalyst base by drying.

If e.g. the catalyst base material is soaked in the blocking fluid and if the accessible pore system is nearly completely filled with the blocking fluid, then it is a matter of course that a subsequent drying step removes fluid first from the pore system's regions that are close to the contact area. This ensures that the blocking fluid is distributed as required by the invention. It is advantageous and economical to carry out drying—at least part of the time—under low pressure so that the drying step is carried out economically and fast.

Any substance that can be transported by the transport fluid may be used as a catalytically relevant substance. However, it is in particular advantageous, if the transport fluid contains at least one metal compound as catalytically relevant substance. All substances may be used, if they may be transformed into catalytically active substances, in particular e.g. tungsten oxide, vanadium pentoxide or molybdenum, copper and iron oxides. In the fluid, those substances are usually present in the form of ions.

According to the above-described method—if the transport fluid and the blocking fluid are miscible liquids—it is in particular advantageous if the blocking fluid contains catalytically neutral ions. The catalytically neutral ions in the blocking fluid slow down the diffusion of the catalytically relevant substance, which is introduced with the transport fluid and which partially diffuses into blocking fluid regions at the phase boundaries between the blocking fluid and transport fluid. It is in particular advantageous if the blocking fluid contains such catalytically neutral ions that can react in a neutralizing way with the catalytically relevant substance. The ions react with each other at the boundary areas between the fluids, preventing the catalytically relevant/active substance from entering deeper into the pore regions filled with the blocking fluid. In those regions, the substance is at least no longer present in a catalytically effective form. Another possibility of reducing the mixing of the transport fluid and the blocking fluid is to lower the temperature.

Gases and liquids may both be used as blocking and transport fluids, wherein in practice most often use is made of substances that are in liquid form under the conditions under which the invention's method is carried out.

It is preferred to choose blocking and transport fluids that do not mix with each other or that mix with each other only to a minor degree. This significantly reduces the mixing of the two fluids and the diffusion of the catalytically relevant substance from the transport fluid into the blocking fluid regions.

Another possibility to introduce the catalytically relevant substance mostly into the pore system's regions that are close to the contact area is first to cool the catalyst base and then soak it with a fluid, wherein the fluid contains at least one dissolved catalytically relevant substance. Since a heat exchange takes place between the catalyst base and the fluid when the fluid enters the pore system, the fluid is cooled the deeper it enters into the pore system. The fluid regions close to the contact area, i.e. the regions of a low pore depth, are warmer than those that are deeper inside the material. By cooling the catalyst base it can be achieved—if there is sufficient heat exchange between the fluid and the catalyst base—that the fluid solidifies (or freezes) so that it will not enter deeper pore regions; accordingly, distributing the catalytically relevant substance is limited to the regions that are close to the contact area.

On the other hand, at a lower fluid temperature, the solubility of the catalytically relevant substance in the cooled fluid can be reduced. Accordingly, before the fluid enters regions that are more remote from the contact area, a part of the substance precipitates out of the fluid on the pore wall. Preferably, the catalytically relevant substance is dissolved in the fluid at a concentration that is close to the saturation limit.

In this case, it is in particular effective to carry out the above-mentioned cooling. since reducing the temperature results in higher precipitation.

Another possibility to introduce the catalytically relevant substance into the pore system comprises the steps of soaking the catalyst base for a first predetermined period of time in transport fluid. wherein the first period of time is selected in a way that the transport fluid essentially reaches the specific pore depth. Subsequently, the transport fluid is removed from the catalyst base in a way that the catalytically relevant substance, which is transported in the transport fluid, remains in the pores.

As already described, the regions of a lower pore depth are to be filled faster with the fluid than the pore spaces that are deeper inside. It takes more time for the fluid to enter the regions of a greater pore depth. This time dependence of the distribution can be used according to the invention. If the supply of the transport fluid to the catalyst base is interrupted at the right time, then the fluid with the catalytically relevant substance has entered only the pore regions that are close to the contact area, but not the pore system's spaces that lie more on the inside. When the catalyst base is dried immediately thereafter, then the fluid can be removed from the pores before it can enter any deeper. The catalytically relevant substance settles on the pore wall areas and there it forms catalytically active centers or the substance combines with the pore wall areas forming catalytic centers.

According to the latter method, it is preferred that the fluid is chosen to have a higher viscosity than water. The viscosity of the transport fluid may be adjusted using known methods, e.g. by adding cellulose. If viscosity is increased, then the fluid enters the pore system at a lower velocity so that observing the first period of time is not that critical or the catalyst base may be longer soaked in the fluid without the fluid filling the complete pore system.

Another possibility to introduce the catalytically relevant substance into the pore system includes the steps of immersing the catalyst base into a transport fluid immersion bath until the catalyst base is soaked, and adding the catalytically relevant substance to the fluid immersion bath, wherein the substance is dissolved in the fluid. The catalyst base remains in the immersion bath for a predetermined period of time so that the substance diffuses into pore regions that are close to the surface. Subsequently, the catalyst base is dried, i.e, the transport fluid is removed.

The described method makes use of the natural process of diffusion of the substance in a fluid. The catalytically relevant substance is added to the fluid, when the catalyst base is already in the fluid and soaked with it. Accordingly, the pore system already contains the transport fluid, but initially without the catalytically relevant substance. When, subsequently, the catalytically relevant substance is dissolved in the fluid, the substance enters the pore system by diffusion processes, wherein diffusion starts at the contact area, i.e. at the point of entry into the pore system. According to the invention, the distribution in the pore system takes place unequally (higher diffusion of catalytically relevant substance into the pore system's regions that are close to the contact area). In addition, the diffusion processes may be accelerated by mechanical support or heating the fluid so that convection processes may also be used to transport the substance. The period of time is selected in a way that the catalytically relevant substance has already entered the pore system's regions of a lower pore depth, but has almost not entered the more inner regions of the pore system having a greater pore depth. After the period of time has expired the catalyst base is taken out of the fluid and dried.

BRIEF DESCRIPTION OF THE DRAWINGS

The invention will now be explained in more detail on the basis of the enclosed drawings showing steps of a preferred embodiment of the method.

The drawings show the following:

FIG. 6: the boundary area of FIG. 5, when a second filling step according to an embodiment of the invention is carried out.

FIG. 7: the boundary area of FIG. 6, after a second removing step according to an embodiment of the invention has been carried out.

DETAILED DESCRIPTION OF INVENTION

Figure 1:
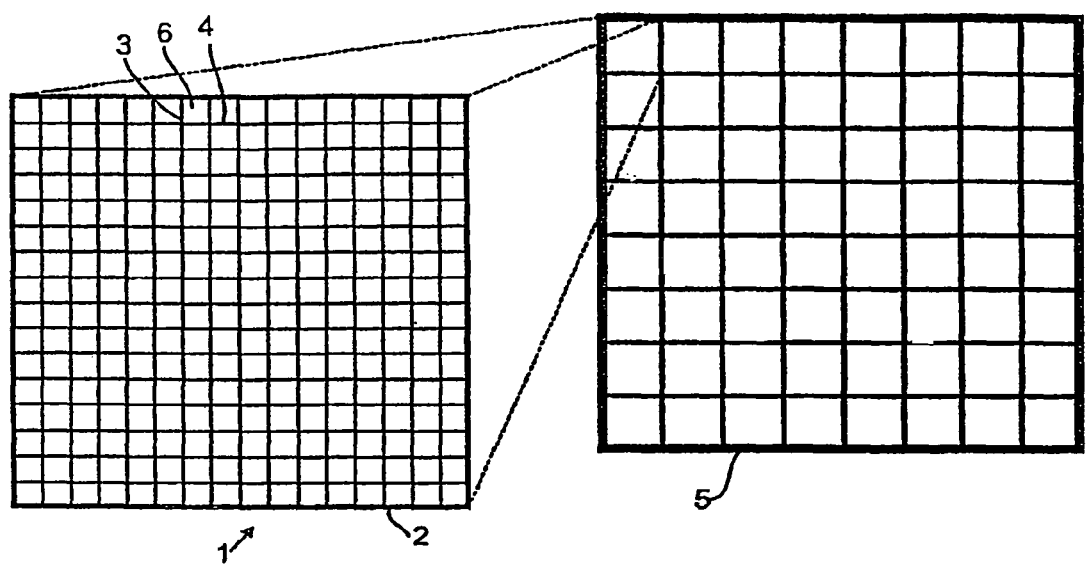
FIG. 1: schematic representation of an arrangement of a plurality of channel catalyst base elements in a frame.

According to the represented embodiment, catalyst bases are used, wherein the catalyst bases have a honeycomb structure with rectangular honeycombs. Reference number 1 in FIG. 1 designates such a catalyst base element. Catalyst base 1 has a surrounding wall 2 forming a quadratic boundary. Between opposing, parallel wall portions, partition walls 3 having a vertical direction and partition walls 4 having a horizontal direction are located, the walls dividing up the space within the surrounding wall 2 to form equally formed honeycombs. Flue gases can stream through the plurality of the honeycombs formed by walls 3 and 4 (perpendicular to the plane of the sheet). For instance, walls 3 and 4 form the boundary of a flue gas channel 6 having a honeycomb form. The catalyst base material that forms walls 3 and 4 as well as the thicker, surrounding wall 2 consists of a porous ceramic so that walls 3 and 4 have significantly increased surfaces.

In a metal frame 5, a plurality of such catalyst bases 1 are arranged side by side and on top of each other to form a greater cross section for the flue gas to stream through.

Figure 2:
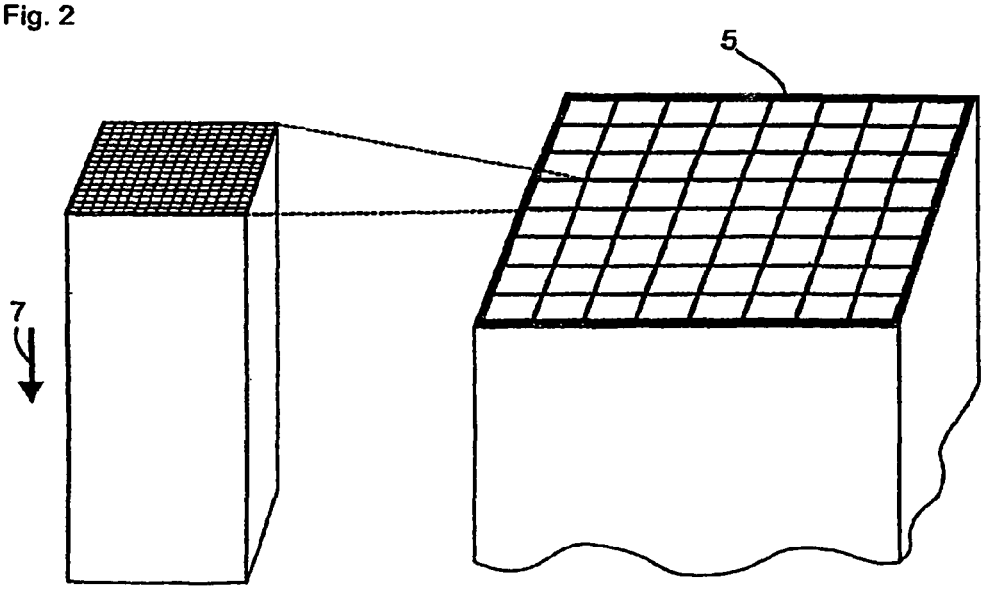
FIG. 2: schematic perspective representation of the arrangement of the channel catalyst base elements according to FIG. 1.

FIG. 2 shows the arrangement of the catalyst bases of FIG. 1 in perspective representation. In frame 5, base elements 1 are arranged horizontally and vertically side by side. The porous material of the catalyst bases comprises active centers accelerating reactions of substances carried by the flue gas stream. Due to the honeycomb structure and a plurality of base elements being connected in series, an intensive contact between the active centers and the flue gas is ensured.

The following figures show a wall area section of the catalyst base.

Figure 3:
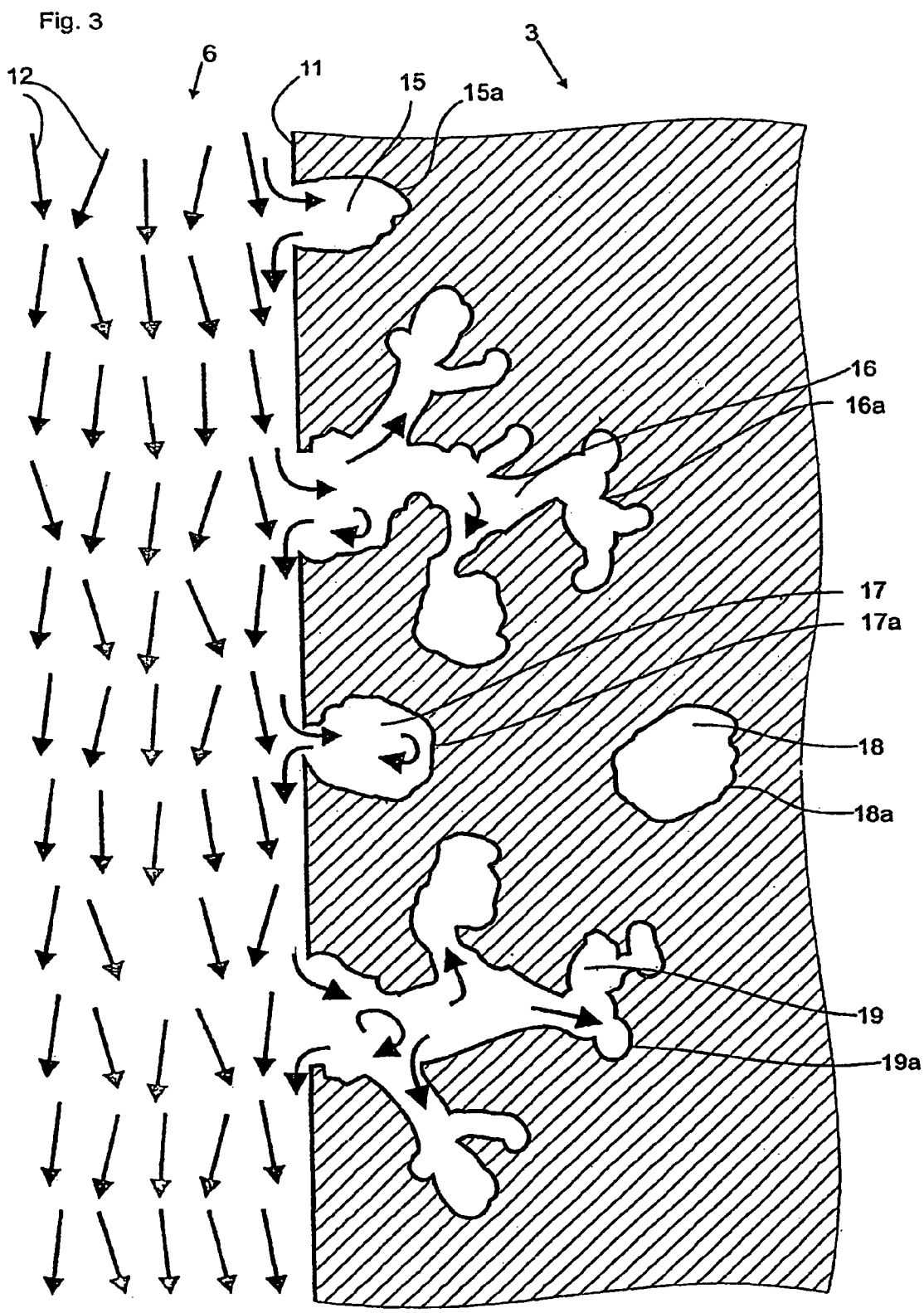
FIG. 3: schematic representation of a boundary area between a catalyst base and a flue gas stream.

FIG. 3 shows a schematic and enlarged cross section through a region close to the surface of wall 3 of catalyst base 1. Contact area 11 forms a boundary area between the material of the catalyst base, i.e. wall 3, and flue gas channel 6. In flue gas channel 6, flue gas 12 streams through the streaming region of the open honeycomb space.

In the material of wall 3, there are a plurality of pores 15, 16, 17, 18, and 19. Pores 15,16,17, and 19 are connected to stream channel 6 through openings in contact area 11. Pore 18 has the form of a bubble and is not connected to flue gas channel 6.

The flue gas streams from flue gas channel 6 through the openings of the pores in contact area 11 into accessible pores 15, 16, 17, and 19, while flue gas that is present in there streams out again. The more the distance from an opening in the contact area is covered by the flue gas within a pore and the deeper the flue gas enters into the pore system in the inside of the material, the longer is the flue gas' residence time in the pore system. The undesired side reactions take place mostly in the regions having a greater distance from contact area 11.

The boundary areas between the pore spaces and the material of the catalyst base are pore wall areas 15*a*, 16*a*, 17*a*, 18*a*, and 19*a*. The pore wall areas are to be covered with active centers, where the pollutants carried in the flue gas stream, in particular nitrogen oxides, are reduced with ammonia added to the flue gas stream. In pores 15 and 17, whose pore spaces do not extend deeply from the contact area into the inside of the catalyst base material, such a reaction is favored. Pores 16 and 19, however, have a larger pore wall area, and they extend more into the catalyst base material with increasing pore depth, and they have a complex structure. Accordingly, the flue gas must cover a longer diffusion way from the openings in the contact area to the spaces that are located deeper in the material.

FIGS. 4, 5, 6, and 7 schematically show the pore system of FIG. 3 during or after carrying out the invention's method for treating a catalyst base.

Figure 4:
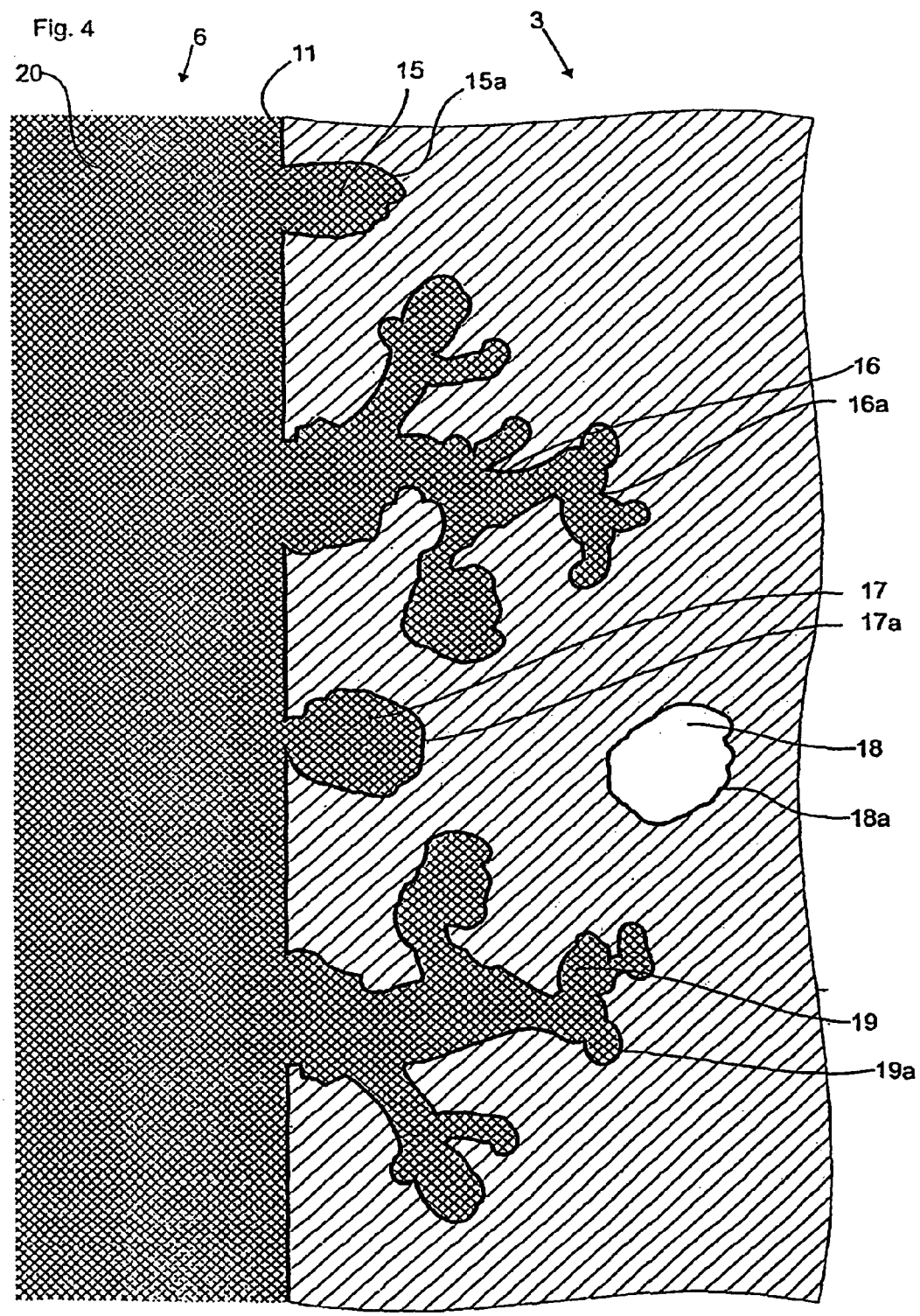
FIG. 4: the boundary area of FIG. 3 when a first filling step according to an embodiment of the invention is carried out.

FIG. 4 shows wall 3 of the catalyst base, when it is immersed in a first fluid 20. Contact area 11 is covered with fluid 20 and accessible pores 15, 16, 17, and 19 are completely filled with the fluid. Filling the pores with the fluid can be achieved by supporting the soaking/immersing process by ultrasonic sound and rotating/shaking the catalyst base. Bubble-like pore 18 is not filled with fluid 20, since the pore is not connected to stream channel 6.

In the simplest case, water is used as fluid 20, wherein the water does not contain any catalytically relevant substances. After soaking the catalyst base, it is taken out of the water, drained, and—in a drying step—fluid 20 is partially removed from the pore system. In order to accelerate the process, the drying step may be carried out under increased temperature or low pressure.

Figure 5:
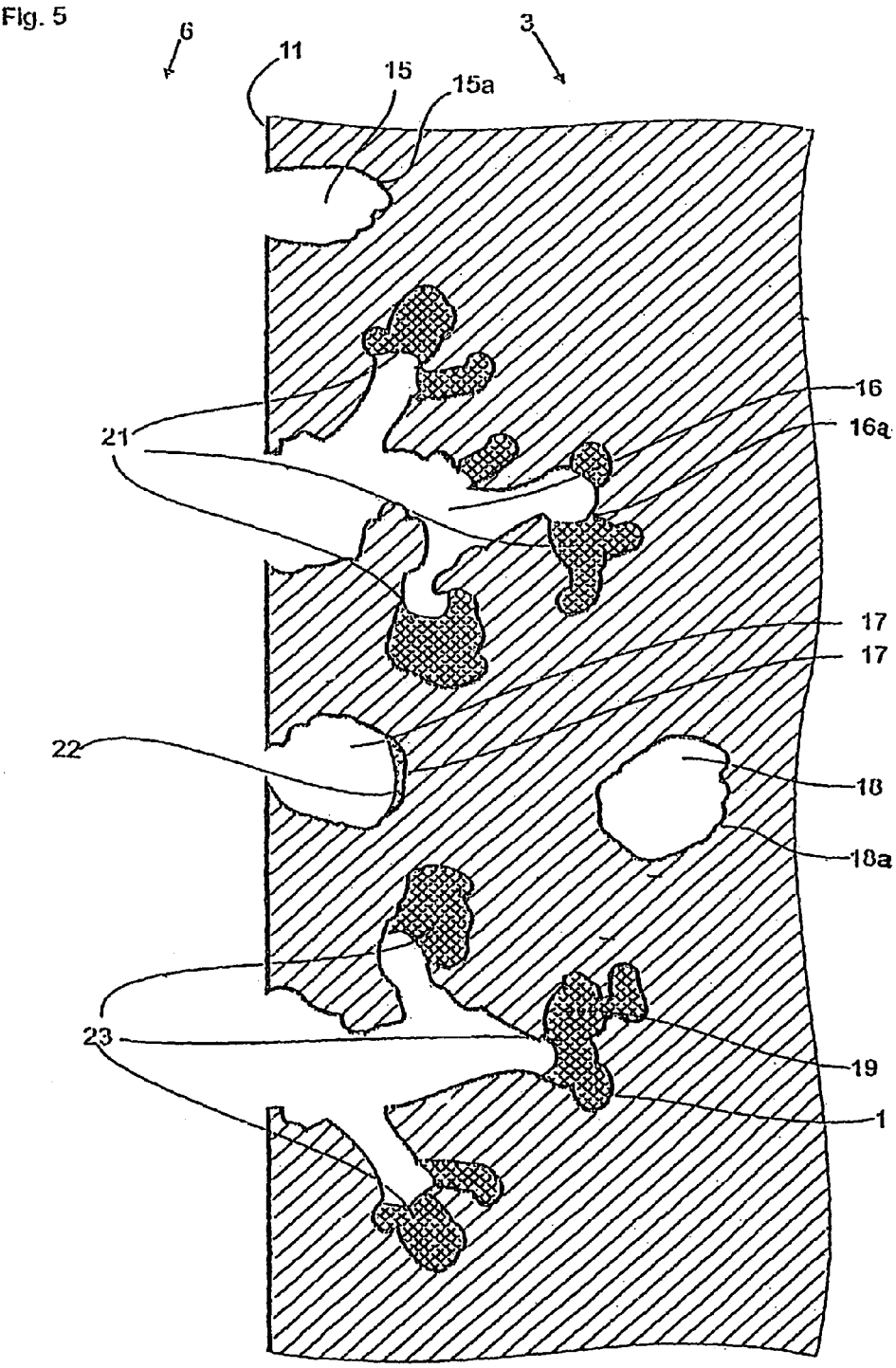
FIG. 5: the boundary area of FIG. 4, after a first removing step according to an embodiment of the invention has been carried out.
Figure 5:
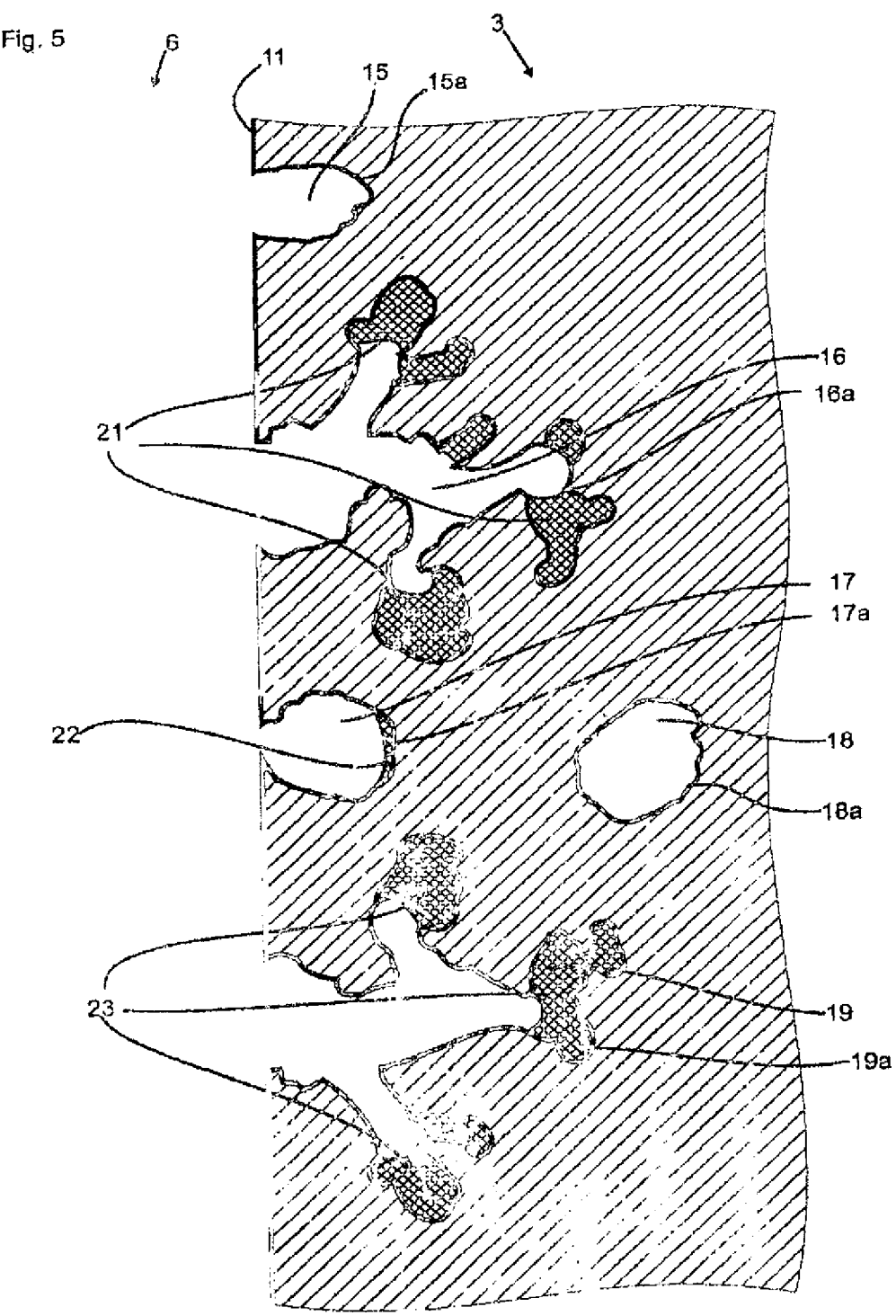

FIG. 5 shows the surface section of FIG. 4 after the drying step.

Pores 16, 17, and 19 are still partially filled with the residue of the fluid 21, 22, and 23, since—according to the invention—the drying step is stopped before the fluid has been completely removed from the pores. For thermodynamic reasons, fluid 20 remains in particular in pore regions that are more remote from the outer openings in contact area 11, i.e. that are located in a greater pore depth. In those regions, the effect of the drying process is smaller. In addition, the residue of the fluid can only be removed from those regions, after the fluid closer to the pore opening has been removed through the pore opening in contact area 11.

In another filling step, the catalyst base is soaked with a second fluid 30 (e.g. by immersion). FIG. 6 shows the surface section of FIG. 5 after the second filling step.

The catalytically relevant substance is dissolved in second fluid 30. As fluid 20 before, fluid 30 also enters the pore system, but it enters only the accessible regions, which are not blocked by first fluid 20. Accordingly, second fluid 30 (with catalytically relevant substance) is contained in particular in the regions that are easily accessible by the flue gas during operation, whereas the deeper branches and pore spaces contain fluid 20 (without catalytically relevant substance). Accordingly, the pore wall areas that are in contact with fluid 30 also have contact with the catalytically relevant substance. The pore wall areas that are in contact with fluid 20, however, do not have any contact to the catalytically relevant substance.

In a final drying step both, fluid 20 and fluid 30 are removed from the pore system, e.g. by heating the catalyst base under low pressure. FIG. 7 shows the surface section of FIG. 6 after the final drying step.

The catalytically relevant substance remains partially on the pore wall areas with which it has been in contact. Contact area 11 as well as portions of pore wall areas 15*a*, 16*a*, 17*a*, and 19*a* are covered with catalytically active centers 40. Those regions of pores 16, 17, and 19 that have a greater distance to contact area 11 and which are therefore not easily accessed by the flue gas during the catalytic operation of the catalyst base do not contain any (or almost no) catalytically active centers. On the other hand, the pore regions that have a short distance to the contact area are densely covered with active centers. Accordingly, the distribution of the active centers after having carried out the method according to the invention is not uniform as it is when the material is soaked in a fluid with a catalytically relevant substance according to the state of the art. Rather, the treatment or doping differs in a way that different regions of the pore wall areas comprise a different amount of active centers depending on the pore depth or the accessibility to the flue gas.

If water or a watery solution is used as transport fluid, the catalytically relevant substance may be a water soluble metal compound that may be transformed to a catalytically active substance after drying and a tempering step. For example, ammonia metavanadate or vanadyloxalate (or the salt of another organic acid) may be used to form vanadium pentoxide. Preferred is the use of soluble substances that, under heat treatment, form volatile compounds (ammonia, water, $CO_2$) and the desired metal oxides ($V_2O_5$, for instance).

A lot of modifications are possible within the limits of the invention. Some of the possibilities for carrying out the method according to the invention have been described, but there are other ways to carry out the method within the limits of the invention.

The specification incorporates by reference the disclosure of European priority document 05 027 634.4 filed Dec. 16, 2005.

The present invention is, of course, in no way restricted to the specific disclosure of the specification and drawings, but also encompasses any modifications within the scope of the appended claims.

What is claimed is:

1. A method for treating a catalyst base, wherein the catalyst base comprises at least one contact area of a porous material, and wherein a fluid is adapted to be conducted along said contact area, the method comprising the steps of:
   introducing at least one catalytically relevant substance into pores of the catalyst base comprising ceramic, titanium dioxide, or zeolite by means of a transport fluid;
   wherein said step of introducing at least one catalytically relevant substance comprises:
      immersing the catalyst base in an immersion bath of the transport fluid free of the at least one catalytically relevant substance until the catalyst base is soaked;
      subsequently adding the at least one catalytically relevant substance to the immersion bath of the transport fluid, whereby the at least one catalytically relevant substance is dissolved in the transport fluid;
      keeping the catalyst base in the immersion bath for a predetermined period of time so that the at least one catalytically relevant substance diffuses into pore system's regions close to the contact area having a lower pore depth but has not diffused to regions of the pore system having a greater pore depth; and
      removing the catalyst base from the immersion bath; and
   removing the transport fluid, wherein the at least one catalytically relevant substance remains on pore wall areas after removal of the transport fluid, wherein said step of introducing at least one catalytically relevant substance is carried out in such a way that, in at least a plurality of pores, an amount of the at least one catalytically relevant substance relative to the contact area remaining on the pore wall areas is a function of location within each pore such that the amount of the at least one catalytically relevant substance relative to the contact area decreases within the pore after exceeding a specific pore depth; and
   heat treating the at least one catalytically relevant substance to convert the at least one catalytically relevant substance to at least one catalytically active substance selected from the group consisting of tungsten oxide, vanadium pentoxide, molybdenum oxide, copper oxide, and iron oxide.

2. The method according to claim 1, wherein the catalyst base is an SCR catalyst base.

3. The method according to claim 2, wherein the SCR catalyst base is a honeycomb SCR catalyst base or plate SCR catalyst base.

4. A method for reactivating an SCR catalyst base comprising at least one contact area of a porous material, the method comprising:
   immersing a catalyst base comprising ceramic, titanium dioxide, or zeolite in an immersion bath of a transport fluid free of at least one catalytically relevant substance until the catalyst base is soaked;
   subsequently adding the at least one catalytically relevant substance to the transport fluid, wherein the at least one catalytically relevant substance is dissolved in the transport fluid;
   contacting the catalyst base with the transport fluid and the at least one catalytically relevant substance in the immersion bath for a predetermined period of time so that the at least one catalytically relevant substance diffuses into pore system's regions close to the external surface of the catalyst base having a lower pore depth but has not diffused to regions of the pore system having a greater pore depth;
   removing the catalyst base from the immersion bath;
   removing the transport fluid from the catalyst base such that the at least one catalytically relevant substance remains on pore wall areas after removal of the transport fluid and an amount of the at least one catalytically relevant substance relative to the external surface remaining on the pore wall area is a function of location within each pore such that the amount of the at least one catalytically relevant substance relative to the external surface decreases within the pore after exceeding the specific pore depth; and
   heat treating the at least one catalytically relevant substance to convert the at least one catalytically relevant substance to at least one catalytically active substance selected from the group consisting of tungsten oxide, vanadium pentoxide, molybdenum oxide, copper oxide, and iron oxide,
   wherein the predetermined period of time is selected such that the at least one catalytically relevant substance diffuses into the pore essentially up to the specific pore depth and wherein the reactivated catalyst displays decreased $SO_2$ oxidation compared to a catalyst having a surface coverage of the catalytically relevant substance that is uniform or increases with increasing pore depth.

5. A method for treating a catalyst base, wherein the catalyst base comprises at least one contact area of a porous material, and wherein a transport fluid is adapted to be conducted along said contact area, the method comprising the steps of:
   introducing at least one catalytically relevant substance into pores of the catalyst base comprising ceramic, titanium dioxide, or zeolite by means of the transport fluid, wherein said step of introducing at least one catalytically relevant substance comprises:
      immersing the catalyst base in an immersion bath of the transport fluid free of the at least one catalytically relevant substance until the catalyst base is soaked;
      subsequently adding the at least one catalytically relevant substance to the immersion bath of the transport fluid, whereby the at least one catalytically relevant substance is dissolved in the transport fluid;
      keeping the catalyst base in the immersion bath for a predetermined period of time so that the at least one catalytically relevant substance diffuses into pore system regions close to the catalyst surface having a lower pore depth but has not diffused to regions of the pore system having a greater pore depth; and
      removing the catalyst base from the immersion bath; and
   removing the transport fluid, wherein the at least one catalytically relevant substance remains on pore wall areas after removal of the transport fluid, wherein said step of introducing at least one catalytically relevant substance is carried out in such a way that, in at least a plurality of pores, an amount of the at least one catalytically relevant substance remaining on the pore wall areas is a function of the relative distance from the contact area, such that a higher concentration of catalytically relevant substance remains on pore wall areas at or near the contact area and a lower concentration of catalytically relevant substance remains on pore wall areas in remote regions of the pores; and heat treating the at least one catalytically relevant substance to convert the at least one catalytically relevant substance to at least one catalytically active substance selected from the group consisting of tungsten oxide, vanadium pentoxide, molybdenum oxide, copper oxide, and iron oxide.

6. The method according to claim 5, wherein the catalyst base is an SCR catalyst base.

7. The method according to claim 6, wherein the SCR catalyst base is a honeycomb SCR catalyst base or plate SCR catalyst base.

8. A method for activating an SCR catalyst base comprising at least one contact area of a porous material, the method comprising:

immersing a catalyst base comprising at least one of ceramic, titanium dioxide, and zeolite in an immersion bath of a transport fluid free of at least one catalytically relevant substance until the catalyst base is soaked;

subsequently adding the at least one catalytically relevant substance to the transport fluid, wherein the at least one catalytically relevant substance becomes dissolved in the transport fluid;

contacting the catalyst base with the transport fluid and the at least one catalytically relevant substance in the immersion bath for a predetermined period of time so that the at least one catalytically relevant substance diffuses into pore system regions closer to the external surface of the catalyst base but has not diffused to regions of the pore system having a greater pore depth;

removing the catalyst base from the immersion bath;

removing the transport fluid from the catalyst base such that the at least one catalytically relevant substance remains on pore wall areas after removal of the transport fluid and an amount of the at least one catalytically relevant substance relative to the external surface remaining on the pore wall area is a function of location within each pore such that the amount of the at least one catalytically relevant substance relative to the external surface generally decreases with increasing depth within the pore, such that a higher concentration of catalytically relevant substance remains on the pore system regions close to the external surface of the catalyst base as compared to regions of the pore system having a greater pore depth; and heat treating the at least one catalytically relevant substance to convert the at least one catalytically relevant substance to at least one catalytically active substance selected from the group consisting of tungsten oxide, vanadium pentoxide, molybdenum oxide, copper oxide, and iron oxide.

9. The method according to claim 8, wherein the SCR catalyst base is a honeycomb SCR catalyst base or plate SCR catalyst base.

10. The method according to claim 8, wherein the SCR catalyst base has been at least partially deactivated, and wherein activating the SCR catalyst base comprises reactivating the SCR catalyst base.

* * * * *

UNITED STATES PATENT AND TRADEMARK OFFICE
CERTIFICATE OF CORRECTION

PATENT NO. : 8,637,417 B2  Page 1 of 1
APPLICATION NO. : 12/384122
DATED : January 28, 2014
INVENTOR(S) : Brüggendick et al.

It is certified that error appears in the above-identified patent and that said Letters Patent is hereby corrected as shown below:

Title Page, Item (73) "Assignee" section delete "Steag", and replace therewith --STEAG--.

Title Page 2, Item (56) "Other Publications" section, line 7 delete "Appliwed" and replace therewith --Applied--.

Title Page 2, Item (56) "Other Publications" section, line 8 delete "Eisenoixde" and replace therewith --Eisenoxide--.

Title Page 2, Item (56) "Other Publications" section, line 9 delete "Losung" and replace therewith --Lösung--.

In the Specification

Column 5, line 42 delete "." and replace therewith --,--.

Column 7, line 35 delete "." and replace therewith --,--.

In the Claims

Column 11, line 13 claim 1, delete "introducing at least" and replace therewith --introducing the at least--.

Column 11, line 35 claim 1, delete "introducing at least" and replace therewith --introducing the at least--.

Column 13, line 27 claim 8, delete "closer" and replace therewith --close--.

Signed and Sealed this
Twentieth Day of May, 2014

Michelle K. Lee
*Deputy Director of the United States Patent and Trademark Office*

UNITED STATES PATENT AND TRADEMARK OFFICE
CERTIFICATE OF CORRECTION

PATENT NO.       : 8,637,417 B2
APPLICATION NO.  : 12/384122
DATED            : January 28, 2014
INVENTOR(S)      : Brüggendick et al.

It is certified that error appears in the above-identified patent and that said Letters Patent is hereby corrected as shown below:

In the Drawings

Delete Drawing Sheet 4, and replace with new Drawing Sheet 4. (Attached)

In the Claims

Column 11, line 13, Claim 1 delete "introducing the at least" and replace with --introducing at least--.

Signed and Sealed this
Eleventh Day of November, 2014

Michelle K. Lee
*Deputy Director of the United States Patent and Trademark Office*